(No Model.)
J. F. HALL.
TROLLEY WHEEL.
No. 503,136. Patented Aug. 15, 1893.
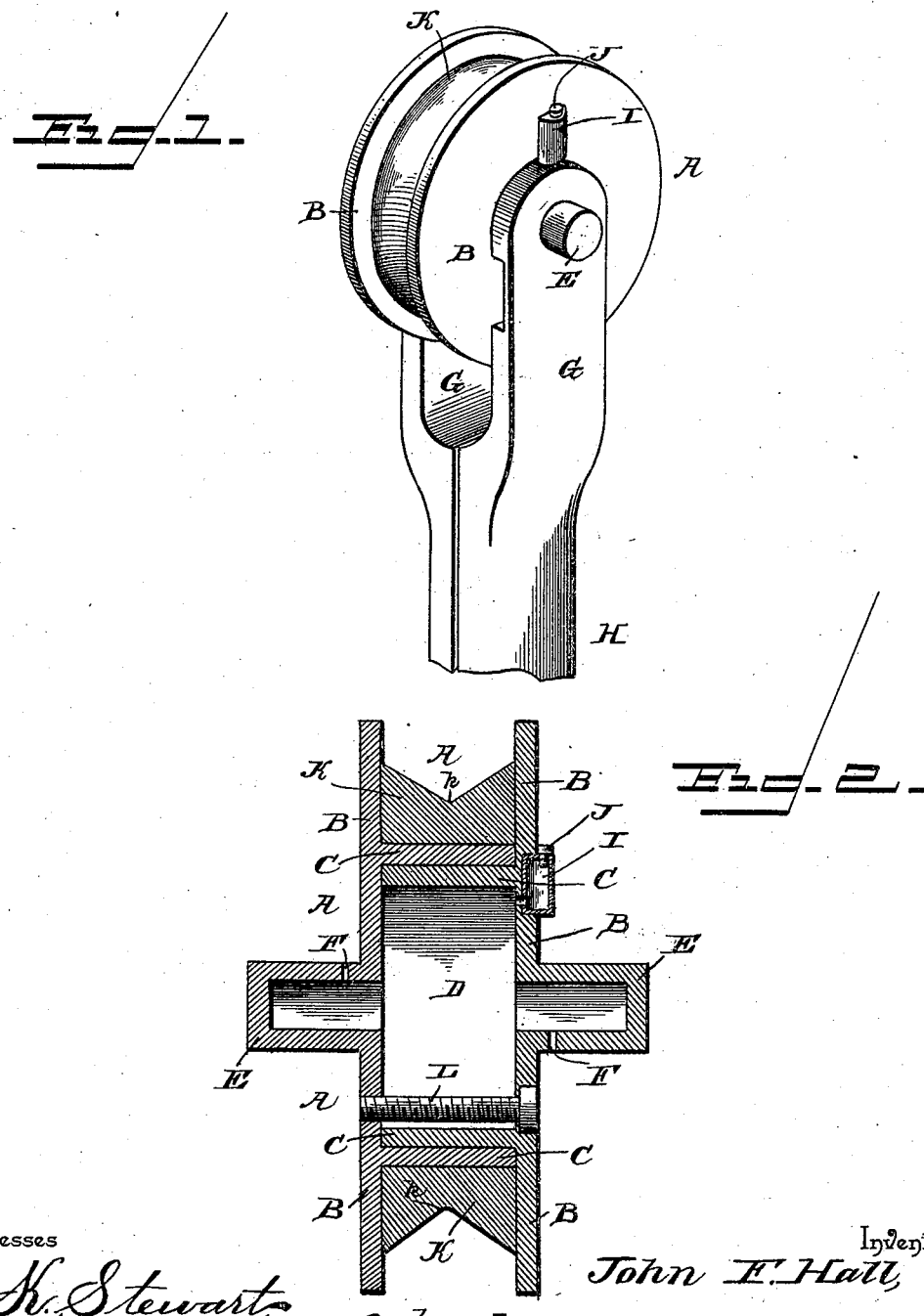

UNITED STATES PATENT OFFICE.

JOHN F. HALL, OF LINCOLN, NEBRASKA.

TROLLEY-WHEEL.

SPECIFICATION forming part of Letters Patent No. 503,136, dated August 15, 1893.

Application filed April 1, 1893. Serial No. 468,687. (No model.)

*To all whom it may concern:*

Be it known that I, JOHN F. HALL, a citizen of the United States, residing at Lincoln, in the county of Lancaster and State of Nebraska, have invented a new and useful Trolley-Wheel, of which the following is a specification.

This invention relates to trolley and other wheels; and it has for its object to provide certain improvements especially in wheels used in connection with electric wires or conductors, and devices for conveying the electric current from the wires or conductors to the motor devices on the car carrying the trolley.

To this end the main and primary object of the present invention is to construct a cheap, simple and efficient trolley wheel, which, while possessing sufficient strength and durability for the work, at the same time is separable so as to allow for the replacing of parts, and is designed to be self lubricating so as to provide for the thorough lubrication of the wheel for considerable periods of time.

With these and many other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a trolley wheel constructed in accordance with this invention, and arranged in the bearing arms at the upper end of a trolley rod. Fig. 2 is an enlarged transverse sectional view of my improved trolley wheel.

Referring to the accompanying drawings, A represents my improved trolley wheel which is provided with the opposite parallel side disks B. The opposite parallel side disks of the wheel are each provided with the inwardly projecting circular rim flanges C, which are of a size so as to snugly overlap each other, or to telescope, to form the main base rim of the wheel, and to form inside of the same an interior oil chamber D. The said side disks B, are further provided with the outwardly extending rounded journals or spindles E, which are hollow and are provided with oil openings F, so as to permit the flow of oil from the interior oil chamber of the wheel into the bearings embracing said journals, which bearings are arranged at the upper extremities of the bearing arms G, carried by the ordinary trolley rod H.

One of the wheel side disks B, is further provided at one side with the interiorly threaded off-standing oil box or filling opening I, which communicates with the space inclosed by the rim flanges C, so that the oil chamber D, can be filled with oil, to provide for the lubrication of the trolley wheel for a considerable length of time. The oil box or filling opening I, is closed by the removable screw plug J.

The opposite wheel disks B, are designed to clamp therebetween the renewable contact ring K. The renewable contact ring K, is grooved in its periphery $k$, to fit the conductor wire, and is designed to fit over the outside one of the rim flanges C, so that it can be clamped fixedly in position between the wheel disks by means of the clamping screws or bolts L, connecting the two wheel disks so as to firmly clamp the several parts of the wheel together. The renewable contact ring K, is made of suitable conducting metal, and when the same becomes slightly worn or impaired in any particular it can be readily replaced by another ring by removing the clamping screws or bolts L, and separating the separate parts of the wheel from each other, as may be clearly seen from the construction disclosed in Fig. 2.

Now from the foregoing it is thought that the construction and many advantages of the herein described trolley wheel will be readily apparent to those skilled in the art, and while I have described the wheel as especially adapted for trolley purposes, nevertheless it will be quite evident that the construction adapts the wheel equally as well for other purposes, such as for pulley use, &c., in which uses the self lubricating feature is a point of special advantage and importance.

Having thus described my invention, what I claim, and desire to secure by Letters Patent, is—

1. A trolley wheel comprising opposite side disks having perforated hollow journals and telescoping flanges inclosing an interior oil chamber, and a renewable contact ring arranged on the telescoping flanges and removably clamped between said side disks, substantially as set forth.

2. A trolley wheel comprising opposite side disks having inwardly projecting circular rim flanges telescoping with each other to inclose an interior oil chamber, and outwardly extending hollow journals having oil openings, one of said side disks being further provided with an off-standing oil box or filling opening leading into the inclosed oil chamber, and a renewable grooved contact ring removably fitted onto the rim flanges between the side disks, and clamping screws or bolts connecting the side disks, substantially as set forth.

3. A sectional wheel having an interior oil chamber and hollow perforated journals extended from opposite sides thereof and communicating with the interior oil chamber, substantially as set forth.

4. A sectional wheel having an inclosed oil chamber and laterally extended hollow perforated journals, and a renewable contact ring fitting the periphery of the wheel, substantially as set forth.

In testimony that I claim the foregoing as my own I have hereto affixed my signature in the presence of two witnesses.

JOHN F. HALL.

Witnesses:
JOHN W. HOLENBECK,
L. C. SLOAN.